UNITED STATES PATENT OFFICE 2,476,306

SOUND INSULATING MATERIALS AND PROCESS OF MAKING

Ellis Gray King, Pittsburgh, Pa., assignor to Armstrong Cork Company, Lancaster, Pa., a corporation of Pennsylvania No Drawing. Application April 2, 1941,
Serial No. 386,486

13 Claims. (Cl. 106—119)

This invention relates to improved heat and sound insulating blocks.

It is an object of the invention to produce a substantially, totally inorganic, non-combustible block having a great number of small and irregular intercommunicating cells imparting to the block a very low density. The block has an improved resistance to moisture and exhibits excellent heat and sound insulating properties.

A further object of the invention is to provide a process for efficiently and economically making a block having the desired characteristics.

The improved block of this invention is composed essentially of a cellular reaction product of an inorganic fiber and an alkaline earth cementitious material, the fiber constituting the predominant solid ingredient by weight in the starting material and being preferably at least about 50% thereof. Besides the inorganic fibers and the cementitious material, additional reactive material, especially that of a siliceous nature, may be employed in making the block. While many blocks have been prepared heretofore from mixtures containing small amounts of inorganic fibers and relatively large amounts of sand and lime, in none of these cases has anything more than a superficial reaction of the cementitious material with the fiber been produced. In such cases, the lime has been caused to react with the sand to form a hard cement which is reinforced by the relatively small amount of fibers which retain their original shape and composition and are merely embedded in the greater mass of the cement. Attempts to make blocks in accordance with the processes heretofore used with a large proportion of the inorganic fibers resulted in products which are generally friable and subject to rapid deterioration because of the lack of reaction between the fibers and the other materials. In contrast with such blocks, those made from relatively large amounts of fibers in accordance with the invention in which the fibers are reacted with the cementitious material to such an extent as to lose their identity within the blocks are harder, stronger, and much less friable. In addition, the blocks made in accordance with the invention have a greatly increased number of large, irregularly-sized and irregularly-shaped intercommunicating cells, the walls of which are rough and highly porous, whereby the sound absorbing capability of the blocks is enhanced.

In general, the process employed is to produce a foam in water from a mixture of the two or more reactants including the fiber, all of such reactants, except the fiber, being in pulverized condition. The foamed mixture of the cementitious substance and the inorganic fiber, with or without additional reactive material, is then caused to react. The reaction may be performed by subjecting the mixture to high temperatures, with or without the addition of water vapor or superheated steam. A preferred process involves the subjection of the mixture to steam in an autoclave or other suitable pressure vessel, in which case the employment of pressure and saturated steam permits the use of lower temperatures.

In the preparation of the foamed mixture, a foaming agent, such as saponin, soap bark, peptones, gelatin, or albumen, is of great advantage. Certain synthetic foaming agents which are unaffected by the cementitious material may be used. The stability of such foams may be increased and the amount of foaming agent required may be considerably reduced by using a small amount of sodium lignin sulfonate, the cheap by-product of the paper industry sold under the trade designation "Plasticaid." This material does not function alone as a foaming agent so it must be used in conjunction with such an agent. The fibers have the function, during the foaming, of acting as supports for the walls of the material surrounding the cells in the foam and of preventing shrinkage during the pre-drying and reacting hereinafter described. However, further stabilization of the foam is desirable to prevent drainage of intercellular fluid and any slow collapsing that might otherwise occur before the partial drying is accomplished. This stabilization is preferably brought about by imparting to the foamed mass a thixotropic condition. This condition may be imparted to the foam by incorporating into the mixture prior to the beating and aeration thereof to the foamed condition a small percentage of bentonite or of a water-soluble organic substance producing a highly viscous solution, for example, a water-soluble cellulose ether, such as methyl or hydroxyethyl cellulose. Alternatively, a hydrated cellulose dispersion has a suitable thickening effect. If desired, a mixture of bentonite with a small amount of the cellulose ether or with the hydrated cellulose dispersion may be employed to advantage.

Since the employment of bentonite involves an inorganic material, it is the preferred thickening agent for the foam. A representative procedure of its use is therefore presented first. A 2% to 5% (or more concentrated) dispersion of bentonite or of a mixture thereof with a water-soluble cellulose ether) is made in water and advantageously a foaming agent, such as saponin or soap bark, in an amount from about 0.1% to 1% of the total weight of the dispersion is added. If desired, from ¼ to 1% of Plasticaid may be present in the dispersion. Air may then be beaten into this mixture to produce a foam. However, before beating the mixture into a foam, a small proportion of the alkaline earth cementitious material may be added, such addition thickening the bentonite suspension to a thixotropic condition so that it may be beaten to produce a foam having better stability. The inorganic fiber may then be incorporated into the foam regardless of whether it was produced with or without the addition of alkaline cementitious material, and thereupon the remainder of the cementitious material and any additional reactive material, such as the siliceous material mentioned above, may be worked in. The several pulverized non-fibrous materials that are added after the incorporation of the inorganic fiber should preferably be mixed intimately with each other prior to mixing them into the foam. This procedure, in which the inorganic fiber is beaten into the liquid foam before any great amount of the cementitious or other pulverulent material is added, gives a more complete dispersion of the fibers and a more uniform intermeshing thereof, thereby producing a stronger block. In this procedure also, there is less chance of forming pellets of the inorganic fiber and the final density of the block is easily controlled.

Alternatively, all of the pulverulent material (intimately mixed with whatever other reactive pulverized ingredients are to be used) may be incorporated into the foamed dispersion of bentonite, or the bentonite dispersion may be beaten with aeration into a foam simultaneously with the incorporation of the pulverulent materials, the inorganic fibers being incorporated into the mixture at the same time or shortly thereafter. This procedure has the advantage of being more direct and simpler than that previously described.

Regardless of which of the two alternative procedures is to be employed, it has been found that the order of the addition of the foaming agent (when such an agent is used) and the cementitious material, particularly if it contains free lime, to the bentonite dispersions is highly important, since the incorporation of the foaming agent into the mixture after such cementitious ingredient has been added always thins the bentonite dispersion to such an extent as to make it unsuitable for use. Quite unexpectedly and surprisingly, it has been found that by employing the proper order of incorporation of the several ingredients, not only is the undesirable thinning of the bentonite dispersion avoided but instead a thickening of the mixture of the cementitious material containing free lime, foaming agent, and bentonite dispersion can be effected to impart to the mixture a viscosity much higher than it wold have had if no foaming agent were employed in the mixture. To obtain the maximum thickness, the free lime-containing cementitious material should be incorporated into the dispersion after the foaming agent has been mixed or dissolved therein. It has also been found that the simultaneous incorporation of a mixture of such cementitious material with the foaming agent into the bentonite dispersion produces a dispersion which is about as thick as would be produced by the addition of the cementitious material alone to the bentonite dispersion but is not nearly as thick as the solution prepared by the addition of the surface active material prior to the addition of the cementitious material containing free lime. These highly thickened dispersions of bentonite containing both the foaming agent and the cementitious substance are of general applicability in the production of cellular materials. If desired, those dispersions containing a foaming agent and cementitious substances which do not contain free lime may have their consistency or thickness increased by the addition of lime or substance containing free lime or by the addition of salts having trivalent cations, such as aluminum sulfate, aluminum chloride in amounts ranging from 0.2 to 0.5% of the total dispersion. Gypsum and ferric sulfate have a similar effect but in markedly less degree.

Instead of a bentonite dispersion, a viscous solution of a water-soluble organic substance such as a cellulose ether of corresponding concentration may be used, but the foaming agent, the cementitious material and the fibers may be added to this dispersion in any order. When a mixture of bentonite and the viscous organic material is employed, the organic material in the form of a solution should preferably be added to the bentonite dispersion containing the foaming agent and the cementitious material prepared as described above to obtain the maximum thixotropic properties. When viscous organic materials of this sort are employed with bentonite, any order of mixing would be satisfactory, but the preferred order just described produces the most advantageous thickening. The employment of the viscous organic substance has the added advantage of imparting a certain adhesiveness and tackiness to the fluid medium which aids in pulling apart any pellets of the fibers and bringing about an intimate intermeshing thereof in the foam.

As a third alternative, a hydrated cellulose may be used with the foaming agent, the cementitious material and the fibers with or without a bentonite dispersion to obtain a medium of suitable viscosity and consistency to adapt it to the formation of a stable foam. The hydrated cellulose may be obtained from wood pulp or cotton fibers by subjecting them to mechanical action under water as by a paper beater or a ball mill. Also a hydrated lignocellulose, such as gelatinized wood which may be made by the comminution of sawdust under water in a ball, rod, or colloid mill, may be employed satisfactorily. When bentonite is used with the hydrated cellulose or lignocellulose, it is preferable that the maximum thickening be obtained by mixing the ingredients in the order specified above in connection with the preparation of the bentonite dispersion proper. In all cases wherein hydrated cellulose or lignocellulose is used in making the insulating block, it is preferably employed in amounts to give a proportion of about 2 to 5% thereof in the final block.

In making up the foam, the water to solids ratio is properly adjusted to assist in the stabilization of the foam. Too little water produces a collapse of the foam while too much water produces excessive drainage and may produce a product having such light weight that it is not sufficiently strong for the purposes for which it is intended to be used. Enough solids should be added to thicken the mixture, to take up the excess water, and to prevent drainage from the foamed mass. By adjusting the moisture content at this point of the procedure within the limits just prescribed, the operator can control to a certain extent the final density of the block, the greater the moisture, the lighter the product.

The foamed mass may then be shaped by transferring it to molds or by extrusion such as by forcing the mass by a screw conveyor through an orifice, prior to being subjected to reaction conditions.

It has been found that the amount of water in the foamed block at the time it is subjected to reaction conditions exerts an important influence upon the final properties of the block. If there is more than about 40% moisture in the block at the time it is subjected to reaction conditions, the final product is highly chalky, weak, and friable. Therefore, the block, immediately after extrusion or molding, is preferably subjected to a pre-drying process in which it is dried at a temperature of about 50° C. to 100° C. and at a relative humidity of about 20% to 50% until it has a moisture content of not over 40% and preferably as low as about 15% to 20%. In the high-temperature reaction procedure without an autoclave, the pre-drying is preferably carried to a bone-dry condition. In any case, prolonged standing in a wet condition is to be avoided during the drying procedure as it produces shrinkage, weakness, and a less permeable product.

While the prior art processes employed large amounts of water to produce light densities with a concomitant shrinkage and chalkiness in the final product, the present process employs large amounts of reinforcing fibers in conjunction with a stabilized foam to obtain low-density blocks substantially free of shrinkage. By pre-drying the foam, stabilized and reinforced as just described, chalkiness and friability in the final block is avoided.

The reaction conditions employed in making the block depend upon the nature of the inorganic fibers as well as the other components. The mineral wools listed hereinafter require a much less drastic treatment than such inert fibers as asbestos. A pre-dried block made from a mineral wool may be reacted by heating the mass at a temperature of about 1000° C., preferably with the accelerating influence of highly superheated steam, for about an hour. Lower temperatures on the order of 750° C. may be employed but require a longer time. Preferably, an alternative procedure is used in which the pre-dried blocks are subjected to wet steam under pressure in a suitable pressure vessel. A pressure of 150 pounds per square inch for about six hours has been found satisfactory, but, of course, higher or lower pressures may be employed for shorter or longer times respectively. Under these conditions, the block undergoes a reaction such that the bentonite, cementitious material, and the mineral wool are no longer distinct or recognizable therein. It is believed that the cementitious material reacts with the mineral wool and the other ingredients present, such as the siliceous materials and the bentonite, thereby producing the highly porous block having a relatively homogeneous composition and numerous intercommunicating and irregular cells. Those blocks produced by reaction at high temperatures differ from those produced with steam under pressure to the extent that the steam-reacted products are hydrosilicates while those reacted at higher temperatures without an autoclave with or without steam are silicates. It is believed that the inorganic fibers, besides reacting with the cementitious material to form a distinctly novel product having an apparently homogeneous constitution in the final block, also impart characteristic structure to the walls of the block because of their fibrous nature in the unreacted state and because of the change undergone during the reaction, thereby maintaining the large intercommunicating cells so that the final block has excellent sound absorption. During the reaction, it is probable that the pulverulent materials present in the cell walls of the foam migrate to the fibers as the foam structure rearranges during drying and at the elevated temperature of reaction, reacting with the fibers to form a highly porous unitary structure containing the large, irregular, intercommunicating cells. In those cases wherein the cellulose ethers are used, with or without the bentonite, there is somewhat improved texture in the block and a characteristic spiral pattern, and also a somewhat improved strength and toughness apparently associated with the increased tackiness imparted to the fluid by these high molecular weight organic substances. Such blocks are also not as chalky as those produced from corresponding compositions without the cellulose ether.

The above-described conditions of reaction are suitable for such inorganic fibers as are generally designated by the expression "mineral wool," including the amorphous wools prepared from fused mineral or synthetic compositions and having a glass-like nature, such as rock wool, slag wool, glass wool, and similar wools high in alumina, such as anthracite ash wool. All of these are composed of very fine interlaced mineral fibers having the appearance of loose wool or cotton being composed principally of silicates of calcium and aluminum and the expression "mineral wool" designates wools of this type.

The alkaline earth cementitious material may be lime, hydrated lime, dolomitic lime, magnesia, hydrated magnesia, Portland cement, quick lime, dry or wet slaked lime, hydraulic lime, barium oxide, slag cement, or a natural cement. The additional optional reactive material, generally of a siliceous nature, that may be employed include such materials as potters' flint, diatomaceous earth, silica, glass, sand, finely ground slag or anthracite ash, artificial or natural pozzuolanas, or any other siliceous material, or mixtures of any of these. Obviously, any mixture of two or more of the different alkaline earth cementitious materials may be employed with or without any one or more of the several siliceous materials.

It is advantageous to use an oil-free or so-called "finish-free" mineral wool although this is not essential. Its use is desirable for it permits more convenient preparation, requires less foaming agent in the batch, and eliminates the possibility of the oil present on the wool rendering the foam unstable and with stable foam there is less tendency toward shrinkage in the final product.

Blocks containing asbestos which were subjected to the conditions described above with reference to the mineral wools, particularly one subjected to steam at 150 pounds per square inch, showed no appreciable reaction so that the final block contained the asbestos as distinctly recognizable fiber forms. The products resulting from the procedure described above and containing mineral wool have densities ranging from as low as about 9 to as high as 35 or more pounds per cubic foot, and exhibits surfaces which are only slightly chalky or quite hard.

The following examples are illustrative of the product produced by this invention.

Example 1

One thousand parts of a dispersion containing 20 parts by weight of bentonite and 10 parts by weight of saponin were beaten into a foam and 612 parts of a mineral wool were added to the foam with agitation. One hundred and six parts of calcium hydroxide were then added and the mass was beaten till a density of 0.703 gram per cc. was obtained. The molded block was pre-dried to 25% moisture content, autoclaved two hours at 150 pounds per square inch steam pressure, and dried at 70° C. No shrinkage occurred during the drying. The density of the dried product was 21.5 pounds per cubic foot. This product had a porcelain-like ring.

Example 2

A solution of 10.2 grams of saponin in 600 grams of water was added to 408 grams of a 5% dispersion of bentonite. A mixture of 150 grams of calcium hydroxide and 150 grams of Garspar (a mixture comprising about 15% of powdered glass and about 85% of silica of such a particle size that about 99% passes a 325 mesh sieve) was sifted into the bentonite suspension and the suspension was agitated for five minutes and then transferred to a vessel where it was aerated and beaten to a light, stiff foam with a density of 0.20 gram per cc. Then 450 grams of a coarse mineral wool (the product on the market specifically referred to as mineral wool) were added slowly over a nine-minute period with the mixer operating at a moderate rate of speed until a final deisity of 0.71 gram per cc. was obtained. The mass was shaped in a sheet iron mold, and the block was partially dried at 70° C. at 50% relative humidity to a moisture content fo 36.4%. It was then autoclaved for six hours at 150 pounds pressure steam, and was then dried for sixteen hours at 70° C. The finished block had a density of 20.6 pounds per cubic foot.

Example 3

A solution of 12.6 grams of soap bark in 32 grams of water was added to a mixture of 356 grams of 5% suspension of bentonite and 520 grams of water. The solution was then thickened by the incorporation therein of 30 grams of a mixture of equal parts by weight of calcium hydroxide and Garspar. The mixture was then transferred to an aerating apparatus wherein the mass was partially foamed to about three times its volume, and then 410 grams of a coarse mineral wool were added over a period of four minutes with continued agitation. The material was then beaten at a high speed for sixteen minutes in order to pull apart the mineral wool clots. Then 245 grams of the mixture of equal parts of calcium hydroxide and Garspar were added over a period of one and one-half minutes with mixing at a moderate speed. The mixture was then beaten at high speed for about twelve minutes to bring it to the desired density of 0.65 gram per cc. The molded block was pre-dried at 20% relative humidity at 70° C. to 17.6% moisture content and autoclaved for six hours at 160 pounds steam pressure and then dried for sixteen hours at 70° C. The density of the finished product was 19.8 pounds per cubic foot.

Example 4

A dispersion of 50 parts by weight of bentonite and 15 parts by weight of soap bark in 1100 parts by weight of water was placed in an aerating vessel and a mixture of 115 grams of active lime with 150 grams of potters' flint was incorporated therein with aeration. Thereafter 750 parts by weight of glass wool were incorporated into the foam. The mass was molded and pre-dried to a moisture content of 20%. The dried block was then subjected to steam under pressure of 125 pounds per square inch for a period of ten hours. After removal of the product from the autoclave, it was dried.

Example 5

A dispersion of 20 parts by weight of bentonite in 500 parts by weight of water containing 10 parts by weight of saponin was thickened by adding a mixture of 84 parts by weight of magnesium oxide and 1 part by weight of calcium oxide and then 30 parts by weight of hydroxyethyl cellulose dissolved in 500 cc. of water were incorporated. Thereupon, 1040 parts by weight of slag wool were incorporated with agitation and aeration to produce a foam. The foamed mass was molded at a density of 0.65 gram per cc. and the molded product was pre-dried to a moisture content of 18%. This product was subjected to steam under 135 pounds per square inch of pressure for a period of seven hours. The dried block weighed 23.5 pounds per cubic foot.

Example 6

Four parts of saponin in 212 parts of water and 130 parts of a mixture of hydrated lime and Garspar in equal proportions were added to a dispersion of 12 parts of hydroxyethyl cellulose in 188 parts of water. The mixture was transferred to an aerating bowl and foamed to a density of 15 pounds per cubic foot. Mineral wool was beaten into the foamed mass until 195 parts of wool were incorporated. Thereafter, 45 parts of mineral wool and 30 parts of the lime and Garspar mixture were added and thoroughly beaten in. The foamed mass was molded at a density of 36 pounds per cubic foot, and was pre-dried at 160° F. to 20% moisture content. The partially dried block was treated six hours with steam at 150 pounds per square inch and dried. The finished block weighed 19 pounds per cubic foot. The surfaces had a pleasing character and were free of chalkiness.

Example 7

A dispersion of 20 parts by weight of bentonite in 1000 parts by weight of water containing 10 parts by weight of saponin was thickened by the addition thereto of 480 parts by weight of Portland cement. Immediately after the addition of cement, 720 parts by weight of mineral wool were beaten into the mixture. The wet mass having a density of 0.615 gram per cc. was molded and was pre-dried to a moisture content of 20%. The pre-dried material was subjected to steam at 150 pounds per square inch pressure for six hours and was then finally dried. The finished block was strong, porcelain-like, and had no tendency to dust. Its density was 24.6 pounds per cubic foot.

Example 8

The procedure of Example 1 but with the substitution of the ingredients listed below was followed:

| | Parts by weight |
|---|---|
| Glass wool (house insulating grade) | 800 |
| Barium oxide | 249 |
| Bentonite (5% dispersion in water) | 400 |
| Saponin | 10 |
| Water | 870 |

The specific gravity of the foamed wet mix was 0.744. The finished block weighed 24.0 pounds per cubic foot.

Example 9

An intimate mixture of Garspar and calcium hydroxide (200 parts by weight of each) was stirred into a dispersion of 18.8 parts of bentonite and 9.4 parts of saponin in 940 parts by weight of water. Then 600 parts of mineral wool were added and the mass was beaten into a foam having a specific gravity of 0.697. The foamed mass was molded and dried 6 hours at 70° C. and finally 12 hours at 100° C. The dried blocks were supported in an oven into which an excess of steam was passed while the temperature was gradually raised during a period of one and one-half hours to 1000° C. and held there for one hour. The reacted blocks were cooled and had a grayish-tan appearance. Some of these blocks were partially sintered to produce a product of a lighter color by gradually reheating them (through one and one-half hours) in an oven to a temperature of 1185° C., maintaining them at this temperature for a quarter of an hour, and then cooling them.

Example 10

To 80 parts by weight of a 5% bentonite dispersion, 50 parts by weight of water, and 56.3 parts by weight of a wet cake of hydrated paper pulp containing 12.8% solids were added. A solution of 2 parts by weight of saponin in 24.5 parts by weight of water was added and the mixture was beaten into a foam. Then 180 parts by weight of lime and 120 parts by weight of mineral wool were added with beating. The foam stability was improved by beating into the mixture 55 parts by weight of a 2% bentonite dispersion containing 1% of saponin and thickened by the addition of a trace of lime. A foamed mixture of good molding consistency and a specific gravity of 0.55 was obtained. The molded block was dried to a moisture content of 20% and was then autoclaved for six hours at 150 pounds per square inch steam pressure. When dried, the block had a density of 15.3 pounds per cubic foot and had a transverse strength averaging 27.4 pounds per square inch. The paper fibers were plainly visible at the surface of the block.

The products are substantially inorganic, fire resistant, non-combustible and highly stable. They do not take up moisture appreciably even in highly humid atmospheres and do not show any appreciable loss of strength even in humid conditions. They are useful for acoustical or thermal insulating applications or for filtering gases. They may be used in making partition walls wherever the loads are kept within the limits of the strength of the product.

While the invention has been disclosed in terms of specific examples employing certain materials in definitely stated proportions, the description is intended to be merely illustrative. It is obvious that various modifications may be made without departing from the spirit of the invention and it is to be understood that the invention is limited only by the appended claims.

I claim:

1. In the process of making a cellular material, the steps of forming a thick dispersion of a foaming agent, incorporating a mineral wool and a reactive alkaline earth cementitious substance therein with aeration, shaping said foamed mass, pre-drying the shaped mass to a moisture content not greater than about 40%, and heating the mass to effect chemical reaction between said mineral wool and said cementitious substance.

2. In the process of making a cellular material, the steps of forming a thick dispersion of bentonite containing a foaming agent, incorporating a mineral wool and a reactive alkaline earth cementitious substance therein with aeration, shaping said foamed mass, pre-drying the shaped mass to a moisture content not greater than about 40%, and heating the mass to effect chemical reaction between said wool and the other substances.

3. In the process of making a cellular material, the steps of forming a thick dispersion of a water-soluble cellulose ether containing a foaming agent, incorporating a mineral wool and a reactive alkaline earth cementitious substance therein with aeration, shaping said foamed mass, pre-drying the shaped mass to a moisture content not greater than about 40%, and heating the mass to effect chemical reaction between said wool and the other substances.

4. In the process of making a cellular material, the steps of forming a thick dispersion of a compound selected from the group consisting of hydrated celluloses and hydrated lignocelluloses containing a foaming agent, incorporating a mineral wool and a reactive alkaline earth cementitious substance therein with aeration, shaping said foamed mass, pre-drying the shaped mass to a moisture content not greater than about 40%, and heating the mass to effect chemical reaction between said wool and the other substances.

5. In the process of making a cellular material, the steps of forming a thick dispersion of bentonite containing a foaming agent and a reactive alkaline earth cementitious substance, foaming said dispersion, incorporating a mineral wool therein with aeration, shaping said foamed mass, pre-drying the shaped mass to a moisture content not greater than about 40%, and subjecting the mass to steam under pressure.

6. In the process of making a cellular material, the steps of forming a thick dispersion of bentonite containing a foaming agent and a reactive alkaline earth cementitious substance, incorporating a siliceous substance and a mineral wool therein with aeration, shaping said foamed mass, pre-drying the shaped mass to a moisture content not greater than about 40%, and subjecting the mass to steam under pressure.

7. In the process of making a cellular material, the steps of forming a thick dispersion of bentonite containing saponin and lime, foaming said dispersion, incorporating therein a mineral wool with aeration, shaping said foamed mass, pre-drying the shaped mass to a moisture content not greater than about 40%, and subjecting the mass to steam under pressure.

8. In the process of making a cellular material, the steps of forming a thick dispersion of bentonite containing a foaming agent, further thickening said dispersion by incorporating therein a reactive alkaline earth cementitious substance, adding thereto a compound selected from the group consisting of hydrated celluloses and hydrated lignocelluloses, and incorporating therein a mineral wool with areation, converting said foamed mass into a shaped mass having a moisture content of not greater than about 40%, and subjecting said mass to steam under pressure.

9. In the process of making a cellular material, the steps of forming a thick dispersion of bentonite and a foaming agent, further thickening said dispersion by incorporating therein a reactive alkaline cementitious substance, adding thereto a water-soluble cellulose ether, foaming said dispersion, incorporating therein a mineral wool, converting said foam into a shaped mass having a moisture content of not greater than about 40%, and subjecting said mass to steam under pressure.

10. In the process of making a cellular material, the steps of forming a thick dispersion of bentonite containing a foaming agent, further thickening said dispersion by incorporating therein lime and a siliceous substance, foaming said dispersion, incorporating therein a mineral wool, converting said foam into a shaped mass having a moisture content of not greater than 40%, and subjecting said mass to steam under pressure.

11. In the process of making a cellular material, the steps of forming a thick dispersion of bentonite containing a foaming agent, further thickening said dispersion by incorporating therein lime and a siliceous substance, foaming said dispersion, incorporating therein a mineral wool, converting said foam into a shaped mass having a moisture content of about 20%, and subjecting said mass to steam under pressure.

12. As an article of manufacture, a cellular block produced as set forth in claim 1.

13. As an article of manufacture, a cellular block produced as set forth in claim 5.

ELLIS GRAY KING.

REFERENCES CITED

The following references are of record in the file of this patent:

UNITED STATES PATENTS

| Number | Name | Date |
|---|---|---|
| 385,694 | Blaszkaye | July 10, 1888 |
| 774,946 | Mitchell | Nov. 15, 1904 |
| 1,009,630 | Barringer | Nov. 21, 1911 |
| 1,045,933 | Belknap | Dec. 3, 1912 |
| 1,091,620 | Barringer | Mar. 31, 1914 |
| 1,204,086 | Sutcliffe | Nov. 7, 1916 |
| 1,569,755 | Irvin | Jan. 12, 1926 |
| 1,590,132 | Teitsworth | June 22, 1926 |
| 1,609,308 | Pratt | Dec. 7, 1926 |
| 1,666,936 | Kern | Apr. 24, 1928 |
| 1,738,906 | Kirschbraun | Dec. 10, 1929 |
| 1,745,084 | Dewey et al. | Jan. 28, 1930 |
| 1,812,306 | Russ | June 30, 1931 |
| 1,943,519 | Denning | Jan. 16, 1934 |
| 1,956,377 | Drill | Apr. 24, 1934 |
| 1,959,658 | Clark | May 22, 1934 |
| 1,961,525 | Offutt | June 5, 1934 |
| 2,060,295 | Finefrock et al. | Nov. 10, 1936 |
| 2,076,078 | French | Apr. 6, 1937 |
| 2,167,455 | Hirschmann | July 25, 1939 |
| 2,182,086 | Kraus | Dec. 5, 1939 |
| 2,205,734 | Scherer | June 25, 1940 |
| 2,326,516 | Brown | Aug. 10, 1943 |

FOREIGN PATENTS

| Number | Country | Date |
|---|---|---|
| 299,854 | Great Britain | 1930 |